(12) United States Patent
Christie et al.

(10) Patent No.: US 7,130,951 B1
(45) Date of Patent: Oct. 31, 2006

(54) METHOD FOR SELECTIVELY DISABLING INTERRUPTS ON A SECURE EXECUTION MODE-CAPABLE PROCESSOR

(75) Inventors: David S. Christie, Austin, TX (US); Geoffrey S. Strongin, Austin, TX (US); Kevin J. McGrath, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 321 days.

(21) Appl. No.: 10/419,091

(22) Filed: Apr. 18, 2003

Related U.S. Application Data (60) Provisional application No. 60/373,571, filed on Apr. 18, 2002.

(51) Int. Cl.
G06F 13/24 (2006.01)
H04L 9/00 (2006.01)

(52) U.S. Cl. .............. 710/261; 710/262; 712/244; 713/164; 713/166

(58) Field of Classification Search ........ 710/261–263, 710/266–267; 712/244, 43, 229
See application file for complete search history.

(56) References Cited

U.S. PATENT DOCUMENTS

| | | | | |
|---|---|---|---|---|
| 4,787,031 A | * | 11/1988 | Karger et al. ............ | 718/100 |
| 4,930,068 A | * | 5/1990 | Katayose et al. .......... | 710/261 |
| 5,148,544 A | * | 9/1992 | Cutler et al. ............. | 710/261 |
| 5,218,712 A | * | 6/1993 | Cutler et al. ............. | 710/261 |
| 5,818,939 A | * | 10/1998 | Davis ..................... | 713/192 |
| 5,844,986 A | * | 12/1998 | Davis ..................... | 713/187 |
| 5,987,604 A | * | 11/1999 | Edrich .................... | 713/1 |
| 6,327,652 B1 | | 12/2001 | England et al. | |
| 6,330,670 B1 | | 12/2001 | England et al. | |
| 6,507,904 B1 | * | 1/2003 | Ellison et al. ............ | 712/229 |
| 6,854,046 B1 | | 2/2005 | Evans et al. | |
| 6,957,332 B1 | * | 10/2005 | Ellison et al. ............ | 713/164 |
| 2002/0002673 A1 | | 1/2002 | Narin | |
| 2003/0041250 A1 | * | 2/2003 | Proudler ................. | 713/182 |
| 2003/0084346 A1 | * | 5/2003 | Kozuch et al. ............ | 713/201 |
| 2003/0140205 A1 | * | 7/2003 | Dahan et al. ............. | 711/163 |
| 2003/0200402 A1 | | 10/2003 | Willman et al. | |
| 2003/0200405 A1 | | 10/2003 | Willman et al. | |
| 2003/0226014 A1 | * | 12/2003 | Schmidt et al. ........... | 713/164 |

FOREIGN PATENT DOCUMENTS

EP          1 209 563 A2    11/2001

(Continued)

OTHER PUBLICATIONS

Intel Corporation; "Intel Architecture Software Developer's Manual vol. 1: Basic Architecture"; Intel Corporation; 1999; pp. 2-7 through 2-10.*

(Continued)

*Primary Examiner*—Paul R. Myers
*Assistant Examiner*—Ryan M. Stiglic
(74) *Attorney, Agent, or Firm*—Meyertons Hood Kivlin Kowert & Goetzel, P.C.; B. Noël Kivlin; Stephen J. Curran (57) ABSTRACT

A method of controlling a secure execution mode-capable processor includes allowing a plurality of interrupts to interrupt the secure execution mode-capable processor when the secure execution mode-capable processor is operating in a non-secure execution mode. The method also includes disabling the plurality of interrupts from interrupting the secure execution mode-capable processor when the secure execution mode-capable processor is operating in a secure execution mode.

26 Claims, 4 Drawing Sheets

FOREIGN PATENT DOCUMENTS

WO    WO 200175565 A2 * 10/2001

OTHER PUBLICATIONS

Intel Corporation; "Intel Architecture Software Developer's Manual vol. 3: System Programming"; Intel Corporation; 1999; varies pages.*

Collins, Robert R.; "The Secrets of System Management Mode"; Dr. Dobb's Journal; Mar. 1997.*

Yee, Bennet; "Using Secure Coprocessors"; Carnegie Mellon University; CMU-CS-94-149; May 1994; all pages.*

"Microsoft Scheme for PC Security Faces Flak", Merritt, *EE Times*, Issue 1227, Jul. 15, 2002.

U.S. Appl. No. 10/419,084.
U.S. Appl. No. 10/429,132.
U.S. Appl. No. 10/654,734.
U.S. Appl. No. 10/419,085.
U.S. Appl. No. 10/419,086.
U.S. Appl. No. 10/419,038.
U.S. Appl. No. 10/419,083.
U.S. Appl. No. 10/419,090.
U.S. Appl. No. 10/419,121.
U.S. Appl. No. 10/419,122.
U.S. Appl. No. 10/419,120.

* cited by examiner

METHOD FOR SELECTIVELY DISABLING INTERRUPTS ON A SECURE EXECUTION MODE-CAPABLE PROCESSOR

This application claims the benefit of U.S. Provisional Application No. 60/373,571 filed Apr. 18, 2002.

BACKGROUND OF THE INVENTION

1. Field of the Invention

This invention relates to computer systems employing secure execution mode-capable processor and, more particularly, to controlling interrupts on a secure execution mode-capable processor.

2. Description of the Related Art

Modern computer systems are revolutionizing the way people live. This is particularly true for system platforms including microprocessors employing the x86 system architecture. The openness of x86-based systems to a myriad of owner-installable third-party peripheral devices and applications has enabled a broad marketplace of hardware and software vendors that has fostered competition, innovation, and evolution. An example of such evolution is the now widespread use of the platform as a digital communication and media system of ever-increasing quality and capability. In concert with the Internet, these system platforms are clearly revolutionizing mass distribution of digital content, allowing on-demand access to newspapers, real-time weather conditions and radio stations from around the world, on-line banking and shopping, and audio and video-based entertainment.

Since the x86 platform is an open architecture, devices typically have vendor-supplied drivers which run in Kernel mode in order to access the devices, and certain software applications may include Kernel mode components. Thus, although the open architecture may have advantages and may still provide a large degree of protection against accidental interference of one application with another, the current architectural protection mechanisms may be exposed in this environment to unwanted manipulation.

Computer systems including microprocessors employing the x86 architecture include features designed to protect against applications interfering with each other. For example, x86-based operating systems rely on two features of the x86 Protected mode architecture to provide an environment where applications are isolated from each other, and critical operating system code and data is isolated from applications: 1) paged virtual memory, and 2) execution privilege level.

Paged virtual memory allows the Operating System (OS) to define a separate virtual address space for each application, and to selectively map individual pages of physical memory into each of those virtual address spaces through a set of address translation tables. This provides each application with its own private section of physical memory for code and data that may be inaccessible to other applications. The virtual memory mechanism may also allow the OS to selectively map pages of physical memory into multiple virtual address spaces, and to selectively designate such pages in virtual space as read-only. This shared mapping capability may also allow a copy of the OS Kernel itself to reside in each application's address space, and may likewise allow shared mappings of peripheral device access ports and associated device driver routines, thus providing applications with efficient access to OS services without requiring costly address space switches. But the OS portion of the address space necessarily includes system data areas that OS code must be able to modify, and which must still be protected from application code. The read-only designation may not provide proper protection for such areas.

The x86 architecture also defines four privilege levels, 0 through 3, which are assigned to regions of code by the OS and kept in code segment descriptors. Typically, the privilege level of currently executing code or procedure will be stored as the Current Privilege Level (CPL). Thus the privilege levels are commonly referred to as CPL0 through CPL3. Using these privilege levels, certain system resources are accessible only to code executing at the proper level. The paged virtual memory architecture may allow access to pages of virtual memory to be restricted by privilege level. Although four privilege levels are defined, only the CPL0 and CPL3 levels are typically used by mainstream operating systems because the paged virtual memory architecture does not distinguish CPL1 or CPL2 from CPL3. CPL0 is commonly referred to as Kernel mode and is the most privileged level, while CPL3 is commonly referred to as User mode and is the least privileged level. OS code and data are typically assigned to CPL0 while application code and data are assigned to CPL3. CPL0 execution privilege does not override read-only protection; the two attributes are independent. Code segment descriptors are used to assign these levels.

In addition to this memory protection, all processor control registers, including those that control virtual memory operation, are by architectural definition accessible only at CPL0. In addition, special control transfer instructions are typically required to switch execution from one segment to another, and hence to switch privilege levels. These instructions allow the OS to limit the targets of such control transfers to specific entry points in OS-controlled code, hence an application may not change privilege level without simultaneously handing control over to the OS.

The isolation of address spaces from each other, and of OS memory from applications, may be completely controlled by the contents of the virtual memory address translation tables. The translation tables define the virtual-to-physical page mappings that isolate one application's memory from another's, and also the read-only and privilege level attributes that protect shared libraries and the OS. The tables themselves are memory-resident data structures, and contain translation entries that map them into the shared OS memory area and restrict access to them to Kernel mode code.

The existing protection mechanisms would seem to provide adequate protection for applications and the operating system. In a well-behaved system, (e.g. correct application of these mechanisms by the operating system, and correct operation of the OS code that controls these mechanisms, and that all other code which runs in Kernel mode does not interfere with this) they do. However, typical x86-based systems include such a large amount of Kernel-mode code, not just from the OS vendors but from many independent sources, that it may be impossible for anyone to assure that such interference, whether accidental or otherwise cannot occur.

Depending on the type of operation that a user is performing and the type of software application that is running, information stored within or running on the computer system may be vulnerable to outside access. Thus, it may be desirable to improve security and thereby possibly make x86 architecture systems less vulnerable to such access.

SUMMARY OF THE INVENTION

Various embodiments of a method of controlling a secure execution mode-capable processor are disclosed. In one embodiment, the method includes allowing a plurality of interrupts to interrupt the secure execution mode-capable processor when the secure execution mode-capable processor is operating in a non-secure execution mode. The method also includes disabling the plurality of interrupts from interrupting the secure execution mode-capable processor when the secure execution mode-capable processor is operating in a secure execution mode.

In one specific implementation, disabling said plurality of interrupts may include holding the plurality of interrupts in a pending state until the plurality of interrupts is re-enabled.

In another specific implementation, the method may also include disabling the plurality of interrupts by executing a clear global interrupt flag instruction and enabling the plurality of interrupts in response to executing a set global interrupt flag instruction.

In yet another specific implementation, the method may include disabling debug traps in response to execution of a clear global interrupt flag instruction.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview of a Secure Computing Platform

Trusted computing enables computer system (e.g., personal computer (PC)) users to participate in new activities such as downloading electronic cash and movies while at the same time being protected from attacks on their privacy. To be part of a trusted computing environment, the PC itself must be trusted by both the user and outside entities such as banks and content providers, for example. Critical elements which may be necessary to create a trusted PC include: a trusted processing environment, platform-specific secrets, cryptographic processing, secure storage and a secure operating system code segment referred to as a Security Kernel (SK). The building blocks to implement these elements will be described in greater detail below.

Processors configured to execute x86 instructions generally include architectural features such as Protected mode, which provides for paged virtual memory and privileged execution modes, and the set of control registers which controls these features. Controlling access to those control registers and page tables may provide additional protection from unauthorized access to program code and data within a computer system. Thus, adding a set of architectural extensions to such processors and corresponding software support may provide this protection. The overall security enhancements to a processor may be referred to as a Secure Execution Mode (SEM). Secure Execution Mode (SEM) is a new operating mode added to a processor that creates a trusted execution environment in which a Security Kernel can run free from external tampering.

Accordingly, a processor capable of operating in SEM may include security hardware (not shown) which, when enabled by SEM, provides support for SEM operating modes such as a trusted execution (TX) mode of operation, for example. As will be described further below, the trusted execution mode may include, depending on what software is executing and its privilege level, the SEM-capable processor operating in a secure user mode and a secure kernel mode in addition to the normal user mode and normal kernel mode. Mechanisms may also be provided to create a protected memory region that may only be accessible by software running within this environment and preventing certain hardware memory accesses (e.g., direct memory access (DMA)).

The new Trusted Execution environment (TX) is somewhat analogous to the traditional normal/protect mode (CPL3/CPL0) mechanism used to separate User and Kernel environments. As described in greater detail below in conjunction with the description of FIG. 1, the combination of User/Kernel modes with trusted/non-trusted modes creates a four-quadrant model. Thus, an SEM-capable CPU contains the hardware mechanisms that create and enforce the TX mode.

Figure 1:
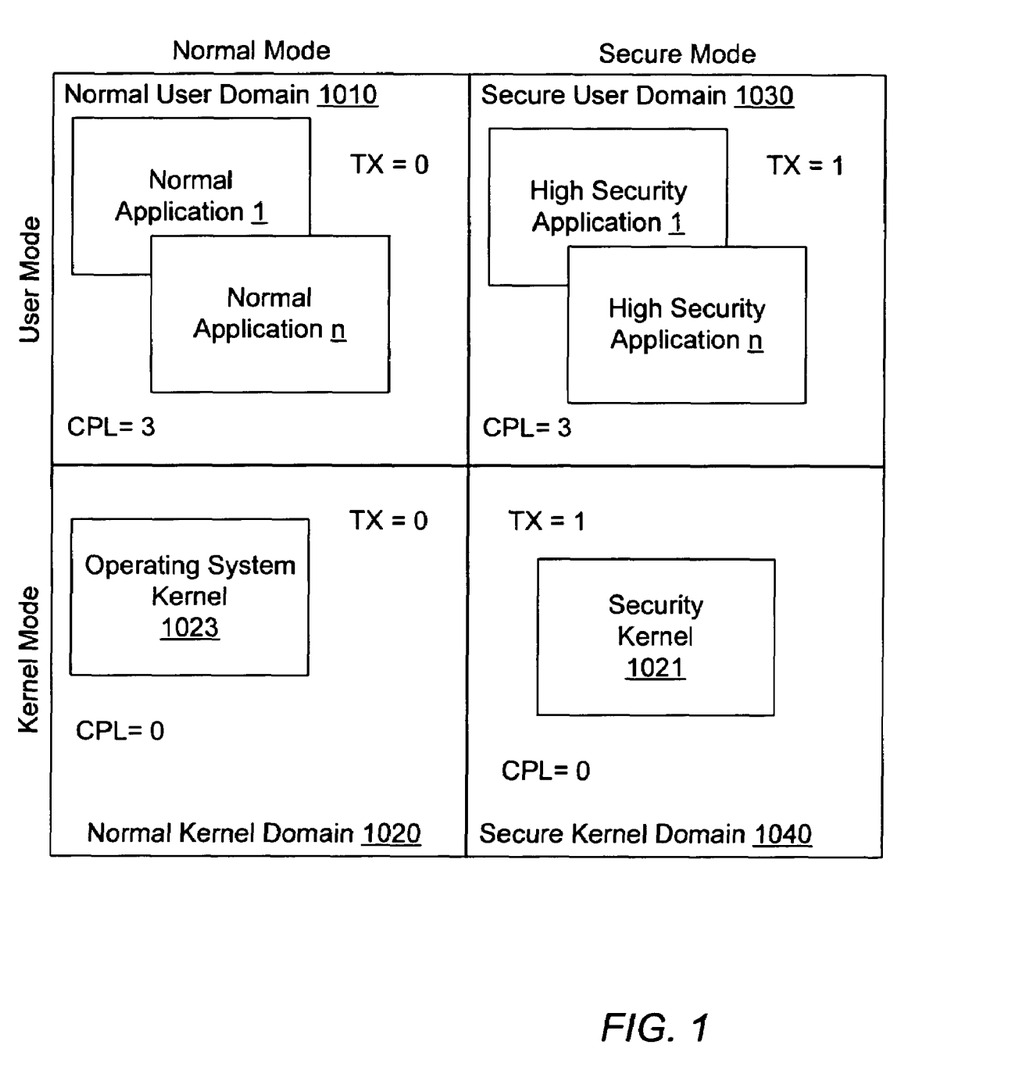
FIG. 1 is a diagram illustrating the operational domains of one embodiment of a secure execution mode-capable processor and the behavior of code operating in those domains.

Turning now to FIG. 1, a diagram illustrating the operational domains of one embodiment of a secure execution mode-capable processor and the behavior of code operating in those domains is shown. As described above, current x86-based operating systems typically use two of the four available privilege levels (e.g., CPL0 and CPL3) to implement two modes within a normal execution mode or protection domain: Normal Kernel Mode and Normal User Mode. The SEM enhancements, when SEM is enabled, define a new execution mode which is referred to as trusted execution (TX) mode. When combined with the existing normal execution mode protection domains, TX mode creates the four distinct modes or software operational domains described below. In the illustrated embodiment, the four domains are normal user (NU) domain 1010, normal kernel (NK) domain 1020, secure user (SU) domain 1030 and secure kernel (SK) domain 1040.

The NU 1010 domain may be characterized by a processor running in normal user mode (i.e. CPL=3) and not in trusted execution (TX) mode. In the NU 1010 domain, typical virtual memory settings allow for normal operation of unmodified applications. Under SEM, such applications are however prevented from accessing the memory of applications residing in the SU domain 1030, or the memory containing Security Kernel 1021 in the SK domain 1040. Further, such applications are prevented from accessing the memory of the OS Kernel 1023 or device drivers in the Normal Kernel domain 1020 by existing protection logic mechanisms such as U/S and R/W page attributes for example (not shown).

In the NK domain 1020, SEM allows for normal operation of unmodified OS Kernel 1023 components and kernel-mode device drivers. Code executing in this domain may access objects in the NU domain 1010, but is prevented under SEM from accessing objects in either the SU domain 1030 or the SK domain 1040. Further, the NK domain 1020 may be characterized by a processor running in Normal Kernel mode (i.e. CPL=0) but not in TX mode. When paging is enabled in the NK domain 1020, a processor may sometimes be referred to as operating in a Native kernel mode.

In the SU domain 1040, SEM may allow a new type of application software such as high security application (HSA) 1, for example to run. HSA software may be prevented from accessing objects in any other domain by existing x86 page protection and page mapping mechanisms. In addition, the HSAs are protected from unauthorized access by any code executing in the NU domain 1010 and the NK domain 1020, including the operating system kernel 1023 and device drivers (not shown in FIG. 2). As will be described in greater detail below, Security Kernel 1021 may be responsible for setting up and maintaining the virtual address spaces of HSAs. Further, the SU domain 1040 may be characterized by a processor running in User mode (i.e. CPL=3) but also in TX mode, which may also be referred to as a secure user mode.

In the SK domain 1040, SEM may allow Security Kernel 1021 full access to all platform resources and in addition may give exclusive control of those resources to Security Kernel 1021. The SK domain 1040 may be characterized by a processor running in Kernel mode (i.e. CPL=0) and also in TX mode, which may also be referred to as a secure kernel mode.

Generally speaking, Security Kernel 1021 is software which runs in the trusted execution (TX) mode. In one embodiment, Security Kernel 1021 may be the only software that runs in SK domain 1040. In SK domain 1040, security kernel 1021 may control all virtual-to-physical memory mappings, and may control what areas of physical memory are accessible to external devices. However, Security Kernel 1021 may rely on the OS kernel's process creation functions, including normal mode virtual memory mappings, initial mapping of HSA memory and loading of HSA code and data sections. Security Kernel 1021 may however monitor every such mapping to ensure that there is no unauthorized mapping of trusted memory into untrusted virtual spaces. Thus, Security Kernel 1021 may regard all areas of memory that are not trusted as untrusted. Further, Security Kernel 1021 may regard all running program code that is not controlled by Security Kernel 1021 to be untrusted. It is noted that in one embodiment, Security Kernel 1021 may be a stand-alone code segment which may be a patch to an existing OS. In alternative embodiments, Security Kernel 1021 may be a module or code segment within and part of a given OS.

Major functions of SEM include placing the system in the trusted environment by initializing the processor to run in SEM, verifying the authenticity of the SK, and protecting the trusted environment from outside attacks. It is noted that the terms CPU, microprocessor and processor may be used interchangeably. Thus, one of the main features of SEM is that SEM protections may be reliably enabled after the system is up and running. In one embodiment, there may be no requirement to change the typical x86 platform boot process. SEM protections may typically be turned on by a system software component that, for the purposes of this document, is referred to as an SEM driver (not shown). The SEM driver may be independent from the OS kernel, but run in kernel mode, much like any device driver. As will be described in greater detail below in conjunction with the descriptions of FIG. 2 through FIG. 4, a key to reliably establishing SEM protections from within the unprotected system environment of the typical x86 platform is a new security instruction referred to as a Security Kernel Initialization (SKINIT) instruction, which is intended for use by the SEM driver.

Central to creating a trusted PC is a unique, platform specific, secret. In practice, this secret may be the private half of a public/private cryptographic key pair. The secret must only be used when the PC is operating within the trusted environment, and it must never be revealed to anyone or any code. The results of cryptographic operations using the secret can be revealed, but not the secret itself. For this to work, the secret and the cryptographic processing machinery that uses it must exist in a closed box with controlled inputs and outputs. In practical terms, a closed box refers to a single integrated circuit (IC) package that combines processing capability and nonvolatile storage. This device is referred to as a Security Services Processor (SSP). In one embodiment, at least one SSP is required and exactly one SSP participates in the platform initialization process.

Architecturally, the SSP may be located anywhere in the platform. The only requirement is that a non-spoofable and secure communication path exist between the SEM-capable processor and the SSP. As used herein, a non-spoofable communication path between the SEM-capable processor and the SSP refers to a secure communication path in which the SSP does not receive commands from either software executing outside of the trusted environment or from DMA hardware. This may be especially complicated when the trusted environment is being initialized. Here, the SSP must verify the validity of the SK and be certain that the SK that is being validated is actually the code running at that instant on the SEM-capable processor. The validation takes the form of a cryptographic hash of the SK image. This hash must be delivered to the SSP in a manner that could not have resulted from the operation of normal software. Further, the SEM-capable processor must begin execution of the SK from a clean initialization state (and the SSP must know this). These requirements may be met by using CPU microcode and hardware mechanisms that are unavailable to normal software. The SKINIT instruction is used to perform various security initialization functions such as reinitializing the SEM-capable processor, verifying that other processors in an MP system are stopped, and communicating with the SSP using reserved system addresses and unique bus transactions and jumping into the SK code, for example. It is noted that in one embodiment, the SKINIT instruction is a single instruction having multiple microcode components which execute atomically. As used herein, to execute atomically refers to executing to completion in a specified order without interruption. It is further noted that in one embodiment, the initialization process includes two steps: the validation of a small Secure Loader (SL) by the SSP, followed by the validation of the much larger SK. The SL is a secure operating system code segment loader which performs functions associated with loading the SK.

Computer Systems Employing a Trusted Computing Platform

Figure 2:
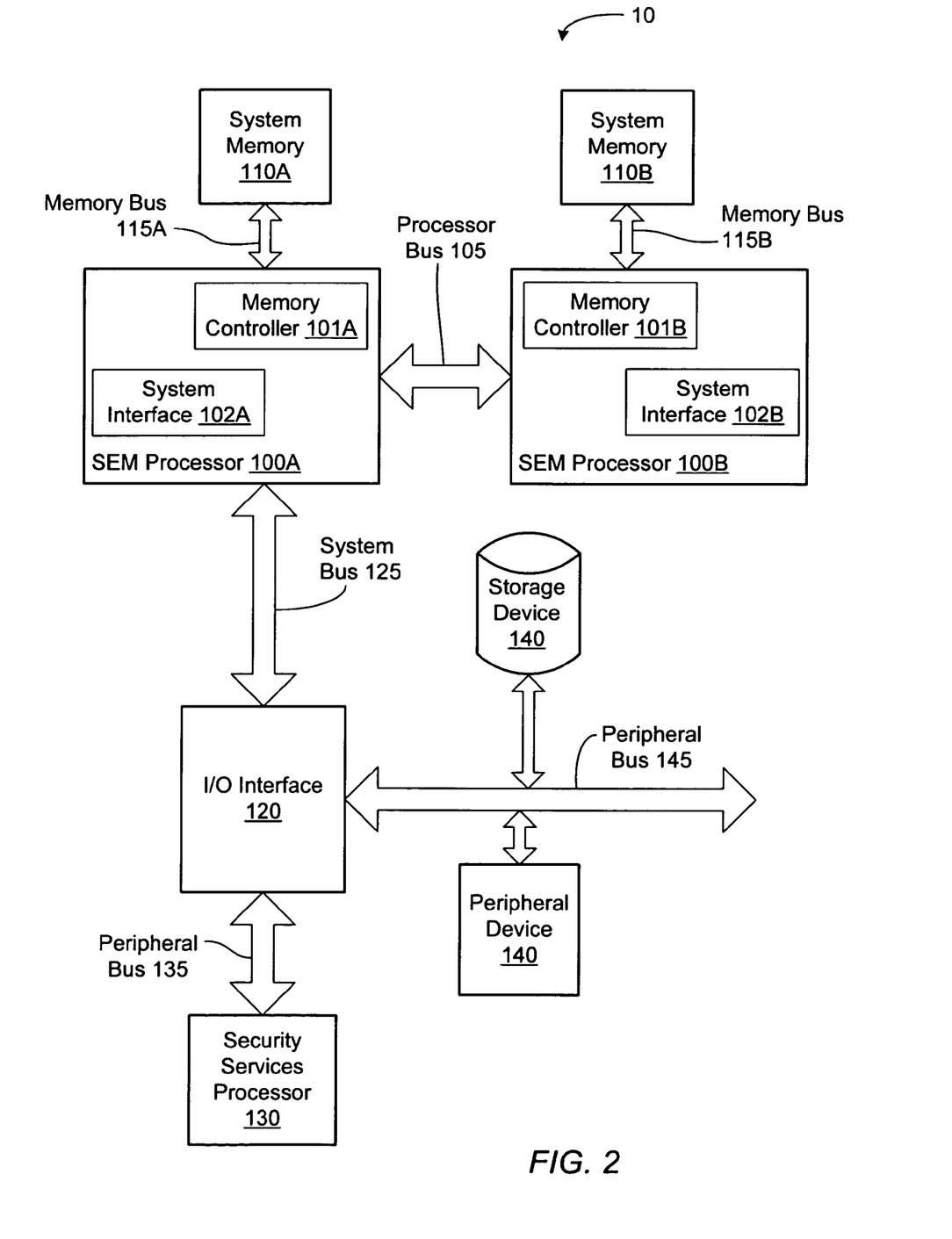
FIG. 2 is a block diagram of one embodiment of a computer system employing a trusted computing platform.

Referring to FIG. 2, a block diagram of one embodiment of a computer system employing a trusted computing platform is shown. Computer system 10 includes two SEM capable processors designated SEM processor 100A and SEM processor 100B. SEM processor 100A is coupled to SEM processor 100B via a processor bus 105. Computer system 10 also includes a system memory 110A which is coupled to SEM processor 100A and a system memory 110B which is coupled to SEM processor 100B. SEM processor 100A is coupled to an I/O interface 120 via a system bus 125. In the illustrated embodiment, I/O interface 120 is coupled to a storage device 140 and to a peripheral device 150 via a peripheral bus 145. I/O interface 120 is further coupled to SSP 130 via peripheral bus 135. In an alternative embodiment, instead of peripheral bus 135, SSP 130 may be coupled to peripheral bus 145. It is noted that although two SEM processors are shown, other embodiments may include other numbers of SEM processors. It is also noted that components having the same reference number and a letter may be referred simply to by the reference number alone. For example, SEM processor 100A may be referred to simply as SEM processor 100 where appropriate. It is further noted that in alternative embodiments, system memories 110 may be connected directly to I/O interface 120. In such embodiments, one or more memory controllers may be manufactured on integrated circuits separate from SEM processors 100A and 100B. For example, in such embodiments, I/O interface 120 may include one or more memory controllers.

SEM processor 100 is illustrative of a processor employing the x86 architecture. For example, in one embodiment, SEM processor 100 may be an Athlon™ processor by Advanced Micro Devices, Inc. As such, SEM processor 100 is configured to execute x86 instructions which may be stored in system memory 110 or storage device 140. In the illustrated embodiment, SEM processor 100 may include security hardware (not shown in FIG. 2) that, when enabled by SEM, provides support for SEM operating modes such as the trusted execution (TX) mode described above in conjunction with the description of FIG. 1, for example.

In the illustrated embodiment, SEM processor 100A and SEM processor 100B each include an integrated memory controller designated memory controller 101A and 101B, respectively. As will be described in greater detail below, memory controller 101 includes security hardware (not shown in FIG. 2) which may protect from unauthorized access, a 64 KB range of addresses used to store the SL image. The security hardware may also be configured to route transactions associated with the SKINIT instruction to I/O interface 120. It is noted that an integrated memory controller such as memory controller 01A and 101B are manufactured on the same integrated circuit as SEM processor 100A and 100B, respectively.

It is noted that in a multiprocessor implementation such as the configuration illustrated in FIG. 2, in accordance with existing Advanced Programmable Interrupt Controller (APIC) standard features, one of the processors is designated as a Bootstrap Processor (BSP) and the other processors are designated as Application Processors (AP). In the illustrated embodiment and for discussion purposes, SEM processor 100A is the BSP, while SEM processor 100B is an AP. However, in other embodiments, SEM processor 100B may be the BSP, while SEM processor 100A may be the AP. Accordingly, an INIT inter-processor interrupt (IPI) may put the APs into a halted state which is responsive only to a subsequent Startup IPI. The Startup IPI may cause APs to begin execution at a location in memory that is specified by the BSP and conveyed along with the Startup IPI. As will be described in greater detail below in conjunction with the description of FIG. 3, while acting as an AP, either of SEM processor 100A or 100B may be configured to respond to a Startup IPI while supporting an SEM initialization.

In the illustrated embodiment, SEM processor 100A and SEM processor 100B each include a system interface unit designated system interface 102A and 102B, respectively. As will be described in greater detail below, system interface 102 includes security hardware (not shown in FIG. 2) which may be configured to support multiprocessor security initialization.

System memory 110 is configured to store program instructions and data that is frequently used by SEM processor 100. In a typical system configuration, storage device 140 may be used to more permanently store the program instructions and data and as SEM processor 100 needs the data and program code, it may be transferred to system memory 110. Additional support for SEM operating modes may be provided by the security kernel which may be executed in conjunction with the OS out of system memory 110 during operation of SEM processor 100. In addition, system memory 110 may be partitioned into a trusted portion and an untrusted portion. The security kernel resides in the trusted portion of system memory 110. As described above, system memory 110 is typically accessed using paged virtual memory. In such an arrangement, system memory 110 may be accessed by individual pages or chunks of memory. This paging function is typically handled by OS memory management functions.

In one embodiment, system memory 110 may be implemented using a plurality of memory chips implemented in dynamic random access memory (DRAM) technology or in one of the varieties of DRAM technologies available, such as synchronous DRAM (SDRAM), for example. The DRAM chips are typically mounted on small circuit boards having an edge connector which are inserted into a socket connector on a motherboard. Depending on the configuration of the boards, they may be referred to as either single or dual in-line memory modules (e.g. SIMMs or DIMMs, respectively). System memory 110 may include multiple banks of memory modules which may allow memory expansion.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral device 150 may be any peripheral device such as a modem, video capture device or other general purpose input output device, for example. It is noted that in other embodiments, other numbers of peripheral devices may be used.

I/O interface 120 may be configured to provide bus control and translation for transactions between different peripheral buses and SEM processors 100A and 100B during normal system operation. In one embodiment, I/O interface 120 may perform functions associated with a Northbridge. For example, peripheral bus 145 may be a peripheral component interconnect (PCI) bus and peripheral bus 135 may be a low pin count (LPC) bus. In addition, I/O interface 120 may be configured to determine whether an SSP is connected to it and to which bus and to allow non-spoofable communication to occur between SEM processor 100 and SSP 130 during a secure initialization. I/O interface 120 may also be configured to recognize SKINIT related messages and transport those messages to SSP 130 in the specific format of peripheral bus 135.

Secure Execution Mode Initialization

Generally speaking, the Security Kernel Initialization instruction (SKINIT) executes on SEM-capable processors such as SEM processor 100A and SEM processor 100B, for example. As described above, the SKINIT instruction may be a single instruction having multiple microcode components which execute atomically. In addition, in one embodiment, the SKINIT instruction may have a single input operand such as the contents of the EAX register, for example. In one embodiment, the SKINIT instruction includes three execution phases: Initialization, Data Transfer and Jump. The SKINIT instruction may include a special protocol which includes explicit start-of-transfer (e.g., Hash_Start) and end-of-transfer (e.g., Hash_End) indications which bracket a variable number of data transfer cycles (e.g., Hash_Data).

Prior to execution of the SKINIT instruction, the SEM driver may make various system preparations such as allocating memory for use by the SL and SK, setting up information that allows the state of the OS to be restored after the SK has gained control (particularly the contents of the various processor control registers such as CR3, IDTR, LDTR, etc) and loading the SL (and possibly the SK) executable image into system memory, for example.

Upon successful completion of the SKINIT instruction, the SL may initialize other SEM hardware mechanisms and data structures, validate the SK executable image, enable SEM, and start execution of the SK. The SK in turn may take control of the address translation tables, control registers and the SEM hardware mechanisms, and then returns to the normal OS which resumes operation where it left off, but with full SEM protections in place. Exact details of SEM driver and SL operation may be implementation specific and dependent on particular OS, SL and SK characteristics.

In one embodiment, the SL image may include the code and initialized data sections of a complete implementation of a Secure Loader. It includes all the code and initial data needed to initialize and start a Security Kernel in a completely safe manner. This includes setting up DMA exclusion protection for memory allocated for SL and SK use. The SL may be loaded by the SEM driver into a region of memory called the Secure Loader Block (SLB), which is described below. The SLB may be 64 KB in size, which may be enforced by hardware. However, in practice, for reasons described below, the maximum size may be somewhat less. In one embodiment, the first word (16 bits) of the SL image includes an unsigned offset into the SL image of the SL entrypoint. The second word includes the length of the image. These two values may be used by the SKINIT instruction. The layout of the rest of the image may be determined by software conventions. The image may also include a digital signature for validation purposes, the hash of which may include the entrypoint and length fields. SKINIT transfers the SL image to the SSP for validation prior to starting SL execution. The SL may execute, at least initially, in flat 32-bit protected mode with paging disabled. To make the SL code position independent a base address may be derived from the value in EAX to access data areas within the SL image using base+displacement addressing.

Figure 3:
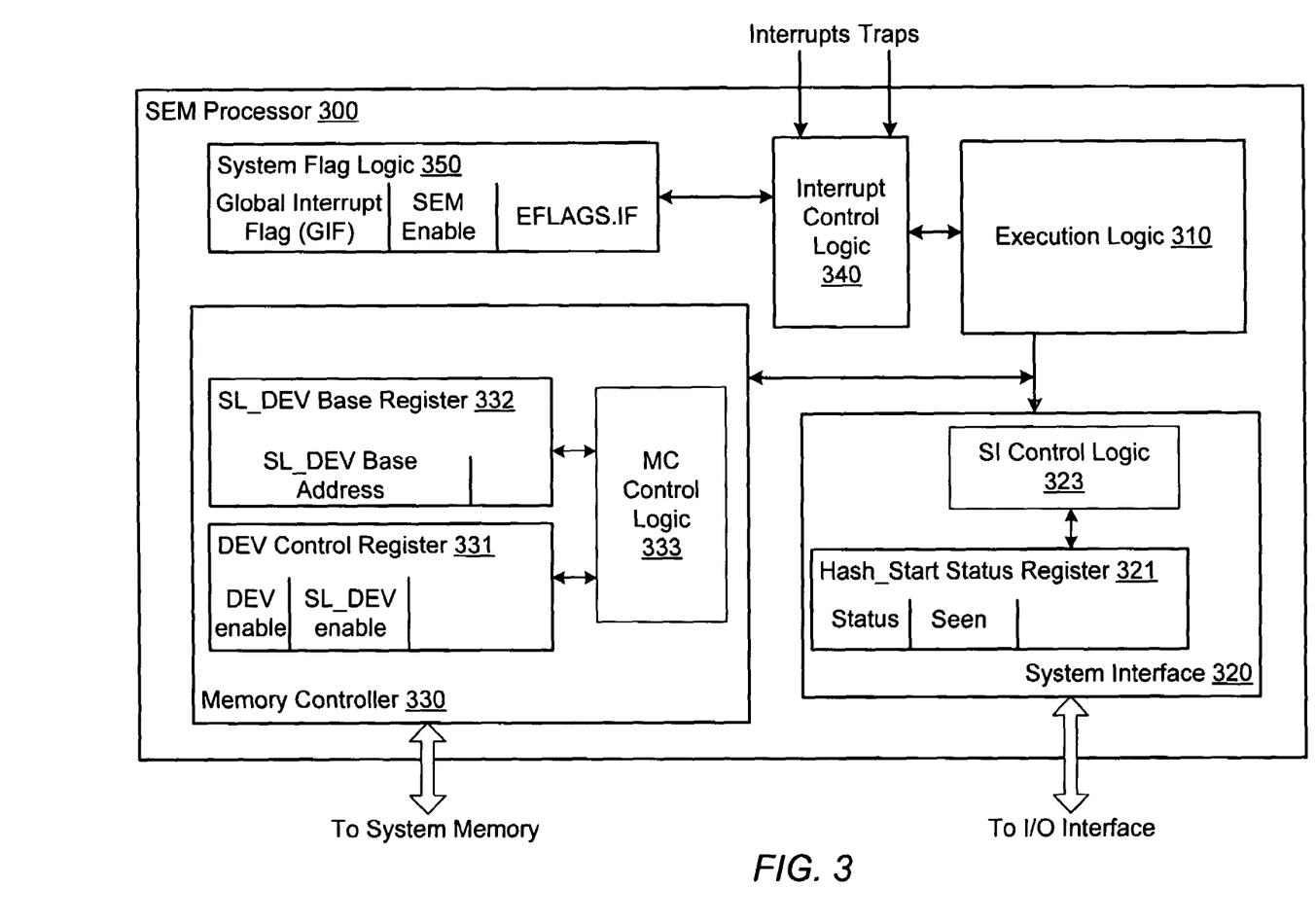
FIG. 3 is a block diagram of one embodiment of a secure execution mode-capable processor.

Turning to FIG. 3, a block diagram of one embodiment of an SEM-capable processor is shown. SEM processor 300 includes an execution unit 310 coupled to a memory controller 330, a system interface 320 and interrupt control logic 340. Further, interrupt control logic 340 is coupled to system flags logic 350. In one embodiment, SEM processor 300 may be representative of SEM processor 100A and 100B shown in FIG. 2.

As described above, during the initialization phase, the SL image may be loaded into system memory 110A by memory controller 330. To protect the SL image prior to preventing DMA accesses from occurring, accesses to the SLB are blocked. The base address of this 64K-byte space is a parameter of the SKINIT instruction (e.g., input to SKINIT using EAX). A Hash_Start transaction carries with it this base address as part of its address field. In this way, all memory controllers receiving the Hash_Start transaction may be informed of which memory region to protect.

In one embodiment, the Secure Loader Block is a 64 KB range of physical memory which may be located at any 64 KB-aligned address. This memory may be allocated by the SEM driver. In alternative embodiments, the memory may be allocated anytime beforehand. The SEM driver may load the SL image into the SLB starting at offset 0 anytime before executing SKINIT. In one embodiment, memory between the end of the SL image and the end of the SLB may be used immediately upon entry by the Secure Loader as secure scratch space, such as for an initial stack, before DEV protections are set up for the rest of memory.

To protect the SLB from access by any device other than SEM processor 300, memory controller 330 includes MC control logic 333 which is coupled to a direct memory access (DMA) exclusion vector control register 331 and to SL_DEV Base Register 332.

DMA Exclusion Vector (DEV) control register 331 includes control information corresponding to the operation of MC control logic 333. In the illustrated embodiment, DEV control register 331 includes control bits designated "DEV enable" and "SL_DEV enable." The "DEV enable" bit may control whether DEV access protection is enabled or disabled. In the illustrated embodiment, when the "DEV enable" bit is asserted, DEV protection is enabled and when the "DEV enable" bit is deasserted, DEV protection is disabled. The "SL_DEV enable" bit may control whether access to the SLB is protected from DMA accesses. In the illustrated embodiment, when the "SL_DEV enable" bit is asserted, the SLB is protected from DMA accesses and when the "SL_DEV enable" bit is deasserted, protection of the SLB is disabled. It is noted that in other embodiments, DEV control register 331 may include other bits having additional functionality.

SL_DEV base register 332 includes information corresponding to the location of the region of system memory protected by the SKINIT instruction (e.g., the SLB). In the illustrated embodiment, the address loaded into SL_DEV base register 332 may correspond to the address of the beginning of the SLB which is to be protected from DMA accesses during execution of the SL and prior to full DMA protection being enabled. This address is referred to as the SL_DEV base address. MC control logic 333 may use the SL_DEV base address to determine whether the destination address of a given access request falls within the protected region. The SL_DEV base register 332 may not be directly visible to software, it may be loaded by MC control logic 333 in response to receiving a Hash_Start transaction. It is noted that in other embodiments, SL_DEV base register 332 may include other bits having additional functionality. Thus, in response to receiving a Hash_Start transaction, MC control logic may be configured to load the SL_DEV base address into the SL_DEV base address register and to also assert the "SL_DEV enable" bit.

In one embodiment, MC control logic 333 may include logic (not shown) which may provide support for secure transfer of the SL image from SEM processor 300 to SSP 130, using a special protocol (unique control, address and/or commands) which may be used only by the SKINIT instruction. This protocol includes explicit start-of transfer (i.e., Hash_Start) and end-of-transfer (Hash_End) indications which bracket a variable number of data transfer cycles (Hash_Data) (anywhere from none to 64 KB worth). The protocol does not allow any other device or instruction other than SKINIT to generate these start, end, and data transfer indications. Accordingly, MC control logic 333 may be configured to route each of the transactions described above to SSP 130. Further, MC control logic 333 may be configured to read the SL out of system memory and to provide the SL image for transmission in the Hash_Data transactions.

In addition, MC control logic 333 may provide SL_DEV support on multiple-memory-controller systems. The SL_DEV_BASE address may be distributed to and enabled on all memory controllers simultaneously, coincident with or prior to the setting of the start-of-transfer status indication.

Further, in multiprocessor systems such as computer system 10, when SEM processor 300 is acting as a BSP, it must ensure that all other processors are in an APIC INIT state prior to sending the SL image to SSP 130 for validation. For example, when executing on a BSP, the SEM driver may issue an APIC INIT IPI to all APs prior to calling the SKINIT instruction. However, when acting as an AP, SEM processor 300 may provide an indication that it has gone into the APIC INIT state. In one embodiment, an AP may provide the indication in response to receiving the IPI. It is noted that in other embodiments the APIC INIT IPI may be issued by microcode of the SKINIT instruction.

To support the APIC INIT functionality in SEM mode, system interface 320 includes SI control logic 323 coupled to Hash_Start Status Register 321. Hash_Start Status Register 321 includes bits corresponding to the init state of other processors within the computer system. In the illustrated embodiment, a Hash_Start Status Register 321 includes a Status bit and a Seen bit. The Status bit is indicative of whether a Hash_Start transaction was successful. In one embodiment, the Hash_Start transaction may determine whether all other processors have transitioned to an APIC INIT state using the Status bit. In other embodiments, the Hash_Start transaction may cause the APIC INIT IPI to be issued thereby causing all other processors to go into the APIC INIT state. The Seen bit may be indicative of whether a Hash_Start transaction was issued by another processor. System interface 320 may use the contents of Hash_Start Status Register 321 to determine if the Hash_Start transaction is successful and whether to notify memory controller 330 to send the SL image or not. It is noted that in one embodiment, the bits within Hash_Start Status Register 321 may not be directly visible to software. SI control logic 323 may be configured to set and clear the bits dependent upon receiving notification from all other processors in computer system 10. It is noted that in other embodiments, Hash_Start Status Register 321 may include other bits having additional functionality.

As described above, in response to receiving a Startup IPI, when acting as an AP, SEM processor 300 may start execution at a location in memory provided with the Startup IPI. In addition, as will be described in greater detail in conjunction with the description of FIG. 4, SI control logic 323 may also be configured to clear the Global Interrupt Flag if the Seen bit is asserted. In one embodiment, the SL may issue the Startup IPI, although in other embodiments it is contemplated that the SK may issue the Startup IPI.

The general x86 architecture provides the EFLAGS register which supports system operational control in non-secure execution modes. Specifically, the IF flag of the EFLAGS register may enable and disable the response of the processor to maskable hardware interrupt requests such as the INTR, for example. Thus, during a non-secure execution mode, a plurality of interrupt sources may interrupt processor execution. However, to maintain system security under SEM, system context switch sequences associated with the SK Entry and Exit must execute atomically, not just with respect to normal external interrupts (e.g., the INTR pin), but also with respect to non-maskable interrupts such as INIT#, NMI, SMI and Debug Port interrupts and Debug traps. Accordingly, in the illustrated embodiment, system flag logic 350 includes a Global Interrupt Flag (GIF), an SEM enable flag and an EFLAGS.IF flag. In one embodiment, the GIF may be configured to enable and disable all interrupts and debug traps when SEM processor 300 is operating in a secure execution mode. The GIF may provide a superset of EFLAGS.IF functionality by encompassing all interrupt sources. It is noted that in one embodiment, the GIF is an internal processor flag and is not normally visible to software. It is noted that although the system flag logic 350 is described as including the GIF, SEM enable flag and the EFLAGS.IF flag, it is contemplated that in specific implementations these flags may be implemented in separate logic blocks.

In the illustrated embodiment, interrupt control logic 340 may receive a plurality of interrupts from many sources both internal and external to SEM processor 300. Interrupt control logic 340 may determine whether SEM processor is operating in the secure execution mode dependent upon the state of the SEM enable bit. Further, in one embodiment, interrupt control logic 340 may be configured to set and clear the GIF in response to execution of two new instructions, STGI and CLGI, respectively. (In this context, setting the GIF refers to asserting the GIF and clearing the GIF refers to deasserting the GIF). It is noted that system flag logic may include storage for storing the GIF state. The storage may be any type of storage such as a register or RAM storage location, for example.

In one embodiment, the STGI and CLGI instructions may be privileged and available only to the SK and to other privileged operations such as the SKINIT instruction and other operations which call the SK. If SEM is not enabled, attempted execution of the STGI and CLGI instructions in any mode may result in an Invalid Opcode fault (#UD). When SEM is enabled, attempted execution of the STGI and CLGI instructions in TX mode at CPL>0 will result in a General Protection fault (#GP), and execution in normal mode at any CPL will result in a #UD exception. It is noted that in one embodiment, execution logic 310 may be configured to generate the Invalid Opcode fault and the General Protection fault (#GP) described above.

In one embodiment, to protect the system context swap sequence, the GIF may be automatically cleared upon entry to the SK from normal mode and any interrupts that assert during this time may be held pending. The SK may set GIF via the STGI instruction after completing the system context swap sequence. At this point any pending interrupts may be responded to using the normal prioritization rules for simultaneous interrupts. It is noted that in one embodiment, the EFLAGS.IF may also be automatically cleared on entry to the SK, thus in addition to STGI, an STI may be required to enable device interrupts. Any pending debug trap however may be ignored and effectively discarded.

In one embodiment, in preparing to exit Secure Execution Mode, the SK may first clear GIF with the CLGI instruction, then perform the necessary system context swap. The GIF may be automatically set by the SMRET instruction.

Figure 4:
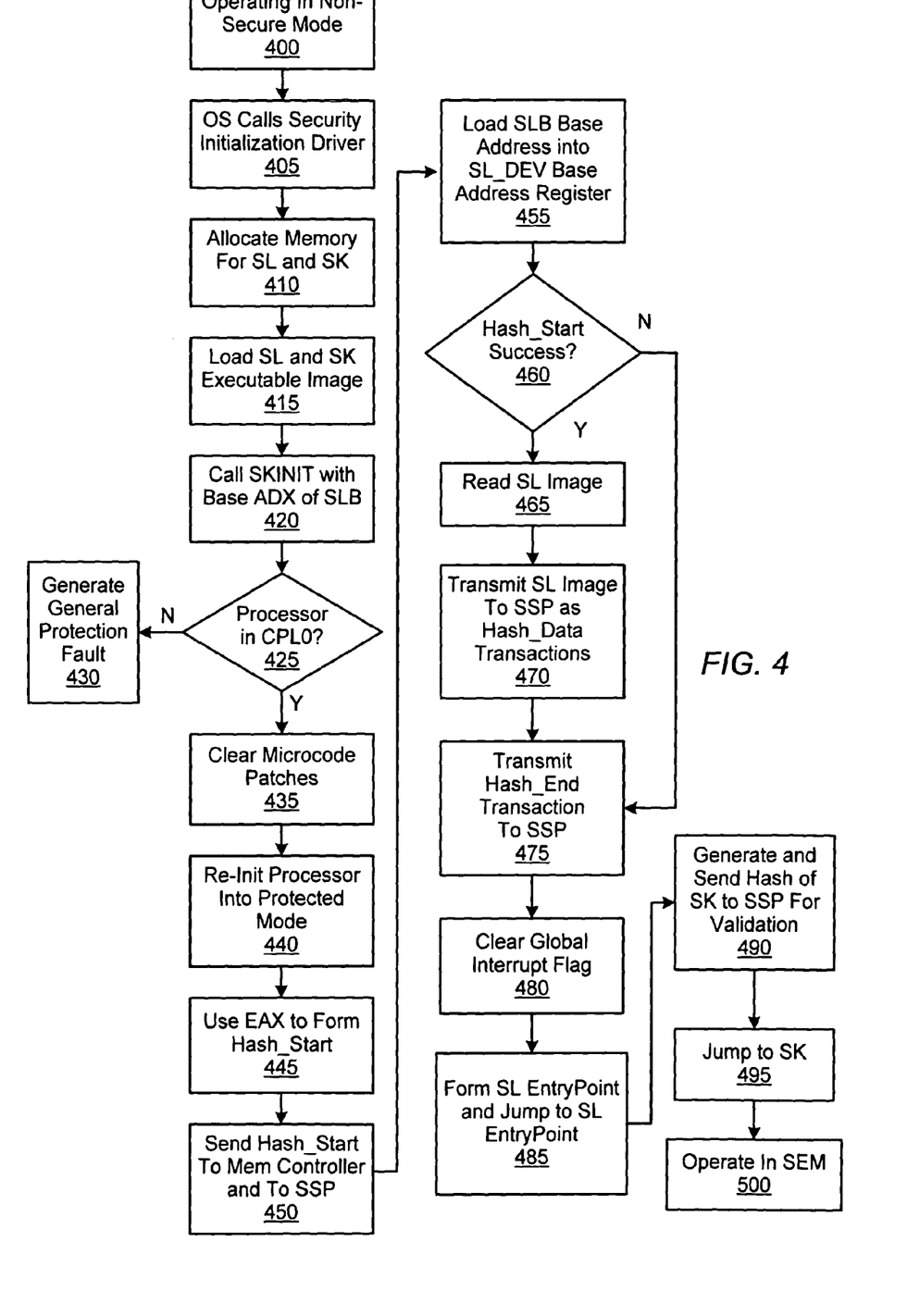
FIG. 4 is a flow diagram illustrating the operation of one embodiment of a computer system including a secure execution mode-capable processor during a secure initialization.

FIG. 4 is a flow diagram describing the operation of one embodiment of a computer system including a secure execution mode-capable processor during a secure initialization. Referring collectively to FIG. 1 through FIG. 4, a secure initialization of a multiprocessor computer system is described. Beginning in step 400, SEM processors 100A and 100B of computer system 10 may be operating in a non-secure mode. The OS of SEM processor 100A calls the SEM driver (block 405). In one embodiment, the SEM driver may make various system preparations such as allocating memory for use by the SL and SK (block 410). The SEM driver may also set up information that allows the state of the OS to be restored after the SK has gained control (e.g., the contents of the various processor control registers) and may further load the SL and SK executable image into system memory 110 (block 415). The SEM driver may store the base address of the 64 KB range of memory where the SL is loaded in the EAX register. Once the preparations are complete, the SEM driver may call the SKINIT instruction (block 420).

As described above, the SKINIT instruction may be a single instruction having multiple microcode components which execute atomically. In one embodiment, the SKINIT instruction is privileged and may be executed by SEM processor 100A at CPL0 (block 425). If execution of SKINIT is attempted in an incorrect mode, it may be inhibited by a General Protection fault (block 430).

Referring back to block 425, if SEM processor 100A is in CPL0, SKINIT may be executed in normal mode when SEM is not enabled. When SEM is enabled, SKINIT may be executed in TX mode (i.e. by the SK). SKINIT is intended to be used primarily in normal mode prior to SEM being enabled, although it may be used by the SK to re-initialize the system as desired. Operation may be the same in either mode.

The microcode of the SKINIT instruction may cause any installed microcode patches to be cleared (block 435). It is noted that up to and including this point, the SKINIT microcode is not patchable. This may effectively make the rest of the SKINIT instruction unpatchable as well. In addition, the state of SEM processor 100A is initialized in same manner as for an INIT# signal then SEM processor 100A processor is placed into flat 32-bit protected mode (with paging off) rather than leaving it in real mode (block 440). For example, in one embodiment, the PE bit of control register CR0 is set to 1; the CS and SS selectors are set to 0008h and 0010h respectively, and CS and SS base, limit and attribute registers are set to the same values as for a system management call (SMCALL) instruction. The DS, ES, FS and GS are left as 16-bit real mode segments, and the SL must reload these with protected mode selectors with appropriate GDT entries before using them. The general registers are cleared except for EAX, which retains its value, and EDX, which includes model, family and stepping information. The cache contents may remain intact, as do the x87 and SSE operand and control registers. Further, most of the model specific registers (MSR) also retain their values, except those which could compromise SEM protections. SKINIT microcode may then form the SLB base address by reading the contents of the EAX register and then clearing bits 15:0 of the EAX register (block 445).

During the data transfer phase, the SKINIT microcode may perform a Hash_Start, a Hash_Data and a Hash_End transaction. In one embodiment, the Hash_Start transaction may be a broadcast transaction sent on all intervening links and buses between SEM processor 100A and SSP 130 and thus may be sent on processor bus 105, system bus 125 and peripheral bus 135 (block 450). Memory controller 101A and 101B may receive the Hash_Start transaction including the SLB base address. MC control logic 333 may load the SLB base address into SL_DEV Base Register 332 and assert the SL_DEV enable bit of DEV control register 331 (block 455). It is noted that each memory controller in the system may perform this function. By asserting the SL_DEV enable bit, the SLB is now protected from accesses by any device other than SEM processor 100A. This mechanism may also protect the SLB against access via graphics address remapping table (GART) translated addresses, and it may also block device accesses to peripheral component interconnect (PCI) Configuration space.

In the multiprocessor environment illustrated in FIG. 2, prior to sending the SL image, SEM processor 100A may determine whether the Hash_Start transaction is successful by waiting for a response from SEM processor 100B (block 460). Acting as an AP, SEM processor 100B may respond to the Hash_Start transaction with a status bit indicating that either: "APIC Init Mode is Active" or "APIC Init Mode is Inactive." If the Hash_Start is a success, SI control logic 323 of system interface 320 may assert the Status bit of Hash_Start Status Register 321. In response to the assertion of the Hash_Start Status bit, the SKINIT microcode may cause MC control logic 333 to read the SL image out of system memory 110 (block 465) and to transmit the SL image to SSP 130 as a series of Hash_Data transactions for validation (block 470). In one embodiment, SSP 130 may use the length field of the SL image to determine the exact length for the hash function.

Once the Hash_Data transaction and its corresponding data is sent to SSP 130, the microcode may perform a Hash_End transaction. The Hash_End transaction may be sent as a broadcast transaction on all intervening links and buses between SEM processor 100A and SSP 130 (block 475). The Hash_End transaction may signal SSP 130 to complete the hash and to verify the SL image signature. In one embodiment, if the SSP validates the SL image signature, SSP 130 may transition to an armed state. In the armed state, SSP 130 may accept a subsequent hash of the larger SK for validation.

The SKINIT microcode may clear the GIF of SEM processor 100A (block 480) to disable all interrupts, including the NMI, SMI and NIT, thereby ensuring that the subsequent code can execute atomically. When acting as an AP, SEM processor 100B may clear the GIF upon receiving an APIC Startup IPI if the Seen bit is asserted.

The SKINIT microcode may form an SL entrypoint by adding the unsigned 16-bit entrypoint offset value from the SL to the SLB base address. SKINIT microcode may complete execution by performing a jump to the SL entrypoint address (block 485). SL execution may now begin from the SL entrypoint. While the SL starts executing on the BSP (e.g., SEM processor 100A), the APs (e.g., SEM processor 100B) remain halted in APIC NIT state.

As describe above the SL may perform various functions to initialize and start a Security Kernel. In one embodiment, the SL may generate a hash of the SK and cause the SK hash to be transmitted to SSP 130 for validation (block 490). SSP 130 may perform a validation of the hash of the SK if it was armed previously. If the SK hash validates, SSP 130 may be unlocked for subsequent cryptographic functions associated with operation of computer system 10 in a trusted execution environment. The SL code then performs a jump to the Security Kernel (block 495). At this point the SK performs any remaining tasks to complete secure system initialization (block 500).

For example, in one embodiment, the SK may issue the Startup IPI for the APs at any suitable point. In alternative embodiments the SL may issue the Startup IPI for the APs. In response to the Startup IPI, the APs start executing at the specified location in 16-bit real mode. In one embodiment, this AP startup code initializes the SEM model specific registers on each AP to appropriate values (as determined by the SL or SK) and enable SEM. The AP code also transitions into and out of TX mode at least once on each AP which sets the GIF and re-enables interrupts, and restores the pre-SKINIT system context (as directed by the SL or SK executing on the BSP), before control of the processor is handed back to the OS. The SL may guarantee the integrity of the AP startup sequence by including the AP startup code in the hashed SL image and setting up DEV protection for it before copying it to the desired area, for example. However, the AP startup code does not need to execute SKINIT.

It is noted that in one embodiment, the validation of the SL image by SSP 130 is a one-way transaction as far as SKINIT is concerned. It does not depend on any response from SSP 130 after transferring the SL image and before jumping to the SL entrypoint to initiate execution of the Secure Loader unconditionally.

It is contemplated that in other embodiments, the SL may establish communication with SSP 130 using standard bus transactions to receive a positive or negative acknowledgement from SSP 130 of the SL image validation. Details of this communication may be implementation dependent.

Referring back to block 460, if SEM processor 100B does not respond with "APIC Init Mode is Active," SEM processor 100A may finish the Hash_Start and then transmit a Hash_End transaction, thereby skipping the Hash_Data transaction. In this case SSP 130 may conclude that no valid SL image was transmitted and may remain unarmed and thus unable to participate in any subsequent SK validation. Operation may then proceed as described above in conjunction with the description of block 475.

It is noted that during the initialization sequence, the SL may abort. In one embodiment, if the SL determines that it cannot properly initialize a valid SK, it may notify SSP 130 that it is aborting. This may be done reliably without needing to establish a secure (e.g., encrypted) communication channel with SSP 130 by zeroing the length field of the SL image, changing the entrypoint to an abort-continuation point, and executing SKINIT.

It is noted that some elements are described as being implemented in hardware while other elements are described as being implemented in software merely as a convenience to convey the operational characteristics of the system and its various components. However, it is contemplated that in various implementations, some or all of the hardware elements described above may be implemented in software and some or all of the software elements described above may be implemented in hardware.

It is further noted that various logic bits have been described as being asserted and deasserted. As used herein, an asserted bit is a bit that provides a positive indication while a deasserted bit provides a negative indication. Accordingly, a specific implementation may use a logic value of one when asserted, while another implementation may use a logic value of zero when asserted.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of controlling a secure execution mode-capable processor, said method comprising:
    operating in a non-secure execution mode;
    entering a secure execution mode by initializing, from the non-secure execution mode, and executing a trusted secure operating system code segment that has been verified external to said secure execution mode-capable processor;
    allowing a plurality of interrupts to interrupt said secure execution mode-capable processor when said secure execution mode-capable processor is operating in a non-secure execution mode; and
    disabling said plurality of interrupts, including software interrupts, from interrupting said secure execution mode-capable processor and ensuring that said plurality of interrupts cannot be re-enabled, except by said trusted secure operating system code segment when said secure execution mode-capable processor is operating in said secure execution mode.

2. The method as recited in claim 1, wherein disabling said plurality of interrupts includes holding said plurality of interrupts in a pending state until said plurality of interrupts is re-enabled.

3. The method as recited in claim 1 further comprising disabling said plurality of interrupts from interrupting said secure execution mode-capable processor in response to a system context switch upon entry into said trusted secure operating system code segment.

4. The method as recited in claim 1 further comprising disabling said plurality of interrupts by executing a clear global interrupt flag instruction.

5. The method as recited in claim 4 further comprising disabling debug traps in response to execution of said clear global interrupt flag instruction.

6. The method as recited in claim 4 further comprising enabling said plurality of interrupts in response to executing a set global interrupt flag instruction.

7. The method as recited in claim 6 further comprising executing said set global interrupt flag instruction and said clear global flag instruction during execution of said trusted secure operating system code segment.

8. The method as recited in claim 6 further comprising executing said clear global flag instruction in response to execution of a security initialization instruction.

9. The method as recited in claim 6 further comprising generating an invalid opcode fault in response to executing said set global interrupt flag instruction when said secure execution mode-capable processor is operating in said non-secure execution mode.

10. The method as recited in claim 6 further comprising generating an invalid opcode fault in response to executing said clear global interrupt flag instruction when said secure execution mode-capable processor is operating in said non-secure execution mode.

11. A secure execution mode-capable processor comprising:
    execution logic configured to execute program instructions in a non-secure execution mode;
    wherein the execution logic is further configured to execute program instructions in a secure execution mode in response to a secure execution mode initialization sequence initiated from the non-secure execution mode, wherein said program instructions include a trusted secure operating system code segment that has been verified external to said secure execution mode-capable processor; and
    interrupt control logic coupled to said execution logic and configured to allow a plurality of interrupts to interrupt said execution logic during operation in a non-secure execution mode;

wherein said interrupt control logic is further configured to disable said plurality of interrupts, including software interrupts, from interrupting said execution logic and to ensure that said plurality of interrupts cannot be re-enabled, except by said trusted secure operating system code segment, during operation in said secure execution mode.

12. The secure execution mode-capable processor as recited in claim 11, wherein said interrupt control logic is further configured to hold said plurality of interrupts in a pending state until said plurality of interrupts is re-enabled.

13. The secure execution mode-capable processor as recited in claim 11, wherein said interrupt control logic is further configured to disable said plurality of interrupts from interrupting said execution logic in response to a system context switch upon entry into said trusted secure operating system code segment.

14. The secure execution mode-capable processor as recited in claim 11 further comprising a global interrupt disable storage configured to disable said plurality of interrupts from interrupting said execution logic during operation in said secure execution mode.

15. The secure execution mode-capable processor as recited in claim 14, wherein said global interrupt disable storage is a global interrupt flag.

16. The secure execution mode-capable processor as recited in claim 14, wherein said plurality of interrupts includes non-maskable interrupts.

17. The secure execution mode-capable processor as recited in claim 11 further comprising an interrupt disable storage configured to disable a portion of said plurality of interrupts from interrupting said execution logic during operation in said non-secure execution mode.

18. The secure execution mode-capable processor as recited in claim 17, wherein said portion of said plurality of interrupts includes maskable interrupts.

19. The secure execution mode-capable processor as recited in claim 11, wherein said interrupt control logic is further configured to disable said plurality of interrupts in response to said execution logic executing a clear global interrupt flag instruction.

20. The secure execution mode-capable processor as recited in claim 19, wherein said interrupt control logic is further configured disable debug traps in response to execution of said clear global interrupt flag instruction.

21. The secure execution mode-capable processor as recited in claim 19, wherein said interrupt control logic is further configured re-enable said plurality of interrupts in response to said execution logic executing a set global interrupt flag instruction during operation in said secure execution mode.

22. The secure execution mode-capable processor as recited in claim 21, wherein said execution logic is further configured to execute said set global interrupt flag instruction and said clear global flag instruction during execution of said trusted secure operating system code segment.

23. The secure execution mode-capable processor as recited in claim 21, wherein said execution logic is further configured to execute said clear global flag instruction in response to executing a security initialization instruction.

24. The secure execution mode-capable processor as recited in claim 21, wherein said execution logic is further configured to generate a fault in response to executing said clear global interrupt flag instruction during operation in said non-secure execution mode.

25. The secure execution mode-capable processor as recited in claim 21, wherein said execution logic is further configured to generate a fault in response to executing said set global interrupt flag instruction during operation in said non-secure execution mode.

26. A secure execution mode-capable processor comprising:
    execution logic configured to execute program instructions in a non-secure execution mode;
    wherein the execution logic is further configured to execute program instructions in a secure execution mode in response to a secure execution mode initialization sequence initiated from the non-secure execution mode, wherein said program instructions include a trusted secure operating system code segment that has been verified external to said secure execution mode-capable processor;
    means for allowing a plurality of interrupts to interrupt said secure execution mode-capable processor when said secure execution mode-capable processor is operating in a non-secure execution mode; and
    means for disabling said plurality of interrupts, including software interrupts, from interrupting said secure execution mode-capable processor and to ensure that said plurality of interrupts cannot be re-enabled, except by said trusted secure operating system code segment, when said secure execution mode-capable processor is operating in said secure execution mode.

\* \* \* \* \*